(12) United States Patent
Chow et al.

(10) Patent No.: US 11,151,633 B1
(45) Date of Patent: Oct. 19, 2021

(54) SYSTEMS AND METHODS OF APPLICATION OF MACHINE LEARNING TO TRAFFIC DATA FOR VEHICLE RECOMMENDATION

(71) Applicant: Capital One Services, LLC, McLean, VA (US)

(72) Inventors: Chih-Hsiang Chow, Plano, TX (US); Elizabeth Furlan, Plano, TX (US); Steven Dang, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/903,750

(22) Filed: Jun. 17, 2020

(51) Int. Cl.
| | |
|---|---|
| G06Q 30/00 | (2012.01) |
| G06Q 30/06 | (2012.01) |
| G08G 1/017 | (2006.01) |
| G06Q 10/08 | (2012.01) |
| G01C 21/34 | (2006.01) |
| G06N 20/00 | (2019.01) |
| G06N 5/04 | (2006.01) |
| G01C 21/28 | (2006.01) |
| G06Q 30/08 | (2012.01) |

(52) U.S. Cl.
CPC ......... *G06Q 30/0631* (2013.01); *G01C 21/28* (2013.01); *G01C 21/3492* (2013.01); *G06N 5/04* (2013.01); *G06N 20/00* (2019.01); *G06Q 10/087* (2013.01); *G06Q 30/018* (2013.01); *G06Q 30/08* (2013.01); *G08G 1/0175* (2013.01)

(58) Field of Classification Search
None
See application file for complete search history.

(56) References Cited

U.S. PATENT DOCUMENTS 10,445,758 B1 * 10/2019 Bryer .................... G06Q 40/08

FOREIGN PATENT DOCUMENTS

| AU | 2013273715 A1 | 7/2014 |
|---|---|---|
| JP | 3816747 B2 | 6/2006 |
| WO | 97/020433 A1 | 6/1997 |

* cited by examiner

*Primary Examiner* — Mila Airapetian
(74) *Attorney, Agent, or Firm* — Bookoff McAndrews, PLLC (57) ABSTRACT

According to certain aspects of the disclosure, a computer-implemented method may be used for providing vehicle recommendations based on traffic camera data. The method may include acquiring traffic data from a plurality of traffic cameras and determining vehicle information based on the traffic data. Additionally, calculating average idling time of vehicles based on the traffic data from the plurality of traffic cameras. Additionally, determining accident information based on the traffic data from the plurality of traffic cameras and selecting at least one available vehicle for purchase, wherein the at least one available vehicle matches one or more predetermined requirements based on the determined vehicle information, average idling time, and the determined accident information. Additionally, transmitting a recommendation based on the selected at least one available vehicle for purchase.

20 Claims, 6 Drawing Sheets

SYSTEMS AND METHODS OF APPLICATION OF MACHINE LEARNING TO TRAFFIC DATA FOR VEHICLE RECOMMENDATION

TECHNICAL FIELD

Various embodiments of the present disclosure relate generally to providing purchase recommendations to purchasers based on acquired traffic data, and more specifically, to artificial intelligence-based purchase recommendations.

BACKGROUND

Traffic cameras and traffic light cameras are increasingly being implemented in a plurality of areas and together may capture a tremendous amount of data. The purpose for traffic cameras and traffic light cameras are typically to regulate traffic and ensure conformity to traffic regulations. For example, traffic cameras may collect data regarding traffic patterns and to identify drivers who may be speeding, or be used for toll collection by either reading a toll payment device or a license plate mounted onto a vehicle. Traffic light cameras may also collect data to identify drivers who may be speeding or who may be disobeying traffic signals.

However, the collected traffic data may be evaluated to establish patterns and associated information, and may be valuable and provide useful assistance for purposes other than traffic regulation.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more recommendations. Each of the examples disclosed herein may include one or more of the features described in connection with any of the other disclosed examples.

In one example, a computer-implemented method may be used for providing vehicle recommendations based on traffic camera data. The method may include acquiring, by one or more processors, traffic data from a plurality of traffic cameras; determining, by the one or more processors using one or more machine learning models, vehicle information based on the traffic data from the plurality of traffic cameras, wherein the one or more machine learning models analyze the traffic data to identify vehicle information; calculating, by the one or more processors, average idling time of vehicles based on the traffic data from the plurality of traffic cameras; associating, by the one or more processors, the determined vehicle information with the calculated average idling time to generate an average idling time; determining, by the one or more processors using the one or more machine learning model, accident information based on the traffic data from the plurality of traffic cameras, wherein the one or more machine learning models analyze the traffic data to identify accident information; selecting, by the one or more processors, at least one available vehicle for purchase, wherein the at least one available vehicle matches one or more predetermined requirements based on average idling time, and the determined accident information; and transmitting, by the one or more processors, a recommendation to a user based on the selected at least one available vehicle for purchase.

According to still another aspect of the disclosure, a computer system for providing vehicle recommendations based on traffic camera data may include a memory having processor-readable instructions stored therein and a processor configured to access the memory and execute the processor-readable instructions to perform a plurality of functions. The functions may include acquiring traffic data from a plurality of traffic cameras; determining vehicle information based on the traffic data from the plurality of traffic cameras using one or more machine learning models, wherein the one or more machine learning models analyze the traffic data to identify vehicle information; calculating average idling time of vehicles based on the traffic data from the plurality of traffic cameras; determining accident information based on the traffic data from the plurality of traffic cameras using one or more machine learning models, wherein the one or more machine learning models analyze the traffic data to identify accident information; selecting at least one available vehicle for purchase, wherein the at least one available vehicle matches one or more predetermined requirements based on the average idling time, and determined accident information; and transmitting a recommendation to a user based on the selected at least one available vehicle for purchase.

According to another aspect of the disclosure, a computer-implemented method may be used for providing vehicle recommendations based on traffic camera data. The method may comprise acquiring, by one or more processors, traffic data from a plurality of traffic cameras; determining, by the one or more processors using one or more machine learning models, vehicle information based on the traffic data from the plurality of traffic cameras, wherein the one or more machine learning models analyze the traffic data to identify vehicle information; calculating, by the one or more processors, average idling time of vehicles based on the traffic data from the plurality of traffic cameras; determining, by the one or more processors using one or more machine learning models, accident information based on the traffic data from the plurality of traffic cameras, wherein the one or more machine learning models analyze the traffic data to identify accident information; receiving, by the one or more processors, route information from a user; determining, by the one or more processors, one or more traffic cameras of the plurality of traffic cameras along a route of the user based on the route information; acquiring, by the one or more processors, route traffic data from the determined one or more traffic cameras along the route of the user; determining, by the one or more processors, route vehicle information based on the route traffic data from the determined one or more traffic cameras along the route of the user; calculating, by the one or more processors, average route idling time of vehicles based on the route traffic data from the determined one or more traffic cameras along the route of the user; associating, by the one or more processors, the determined route vehicle information with the calculated average route idling time to generate a route-specific average idling time; determining, by the one or more processors, route accident number based on the traffic data from the determined one or more traffic cameras along the route of the user; comparing, by the one or more processors, the determined route vehicle information, the route-specific average idling time, and the determined route accident number with the determined vehicle information, the average idling time, and the determined accident information, respectively; selecting, by the one or more processors, at least one available vehicle for purchase, wherein the at least one available vehicle matches a predetermined requirement based on the comparison of the determined route vehicle information, the route-specific average idling time, and the determined route accident number with the determined vehicle information, the average idling time, and the determined accident information, respectively; and displaying, by the one or more processors, the at least one available vehicle to the user.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in an overly limiting sense.

The phrase "in one embodiment" as used herein does not necessarily refer to the same embodiment throughout the specification, and the phrase "in another embodiment" as used herein does not necessarily refer to a different embodiment. It is intended, for example, that claimed subject matter include combinations of exemplary embodiments in whole or in part.

The terminology used herein may be interpreted in its broadest reasonable manner, even though it is being used in conjunction with a detailed description of certain specific examples of the present disclosure. Certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides methods and systems for providing users with recommendations for vehicles for purchase that may be optimized given their personal commute or travel needs. As vehicles travel through areas with traffic and/or traffic light cameras, the amount of data these cameras collect may greatly improve vehicle recommendations. Various elements from the collected traffic data may be used to provide tangible values to users searching for available vehicles. The elements may be inputted into machine learning models to output a vehicle recommendation. While automotive vehicles are referenced herein as an exemplary subject for purchase to which the systems and methods described herein may apply, it will be understood that this disclosure is not limited to automotive vehicles and may apply to other contexts, such as the purchase or lease of real estate, technology, boats, other vehicles, mattresses, animals, travel (e.g., airline tickets, lodging, and the like) and/or other items. The systems and methods described herein may be used in order to present information and recommendations to users. In some embodiments, the systems and methods disclosed herein may base these recommendations at least in part on information gathered regarding the travel patterns of the user.

While the disclosure includes descriptions of exemplary methods, it will be understood that the steps of each method may be combined in various combinations or permutations and/or may be mixed and matched. For example, a step from one exemplary method may be used in conjunction with steps of another exemplary method. Additionally, one or more steps from an exemplary method may be removed or repeated, and it is contemplated that other steps may be added anywhere into methods disclosed herein.

Figure 1:
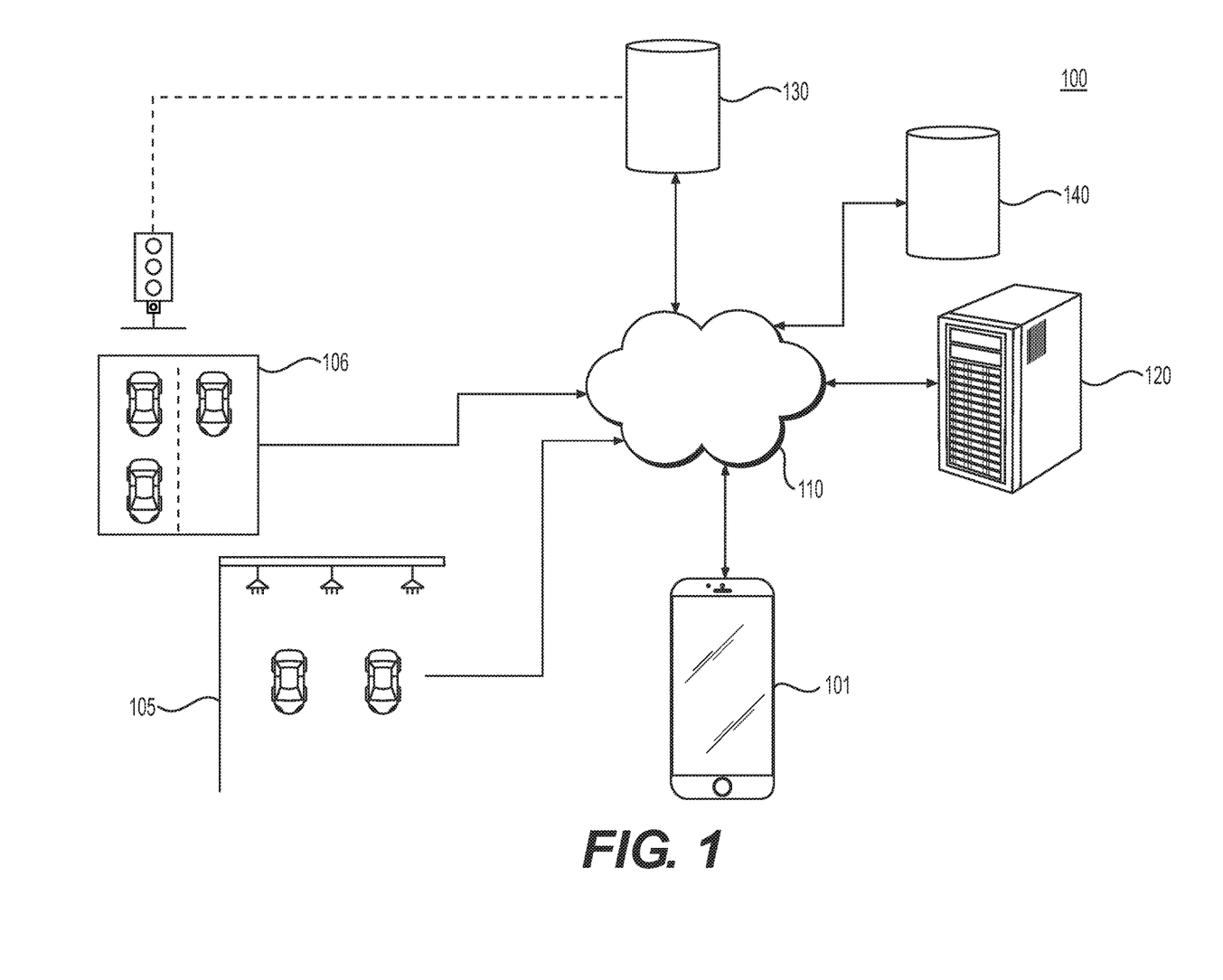
FIG. 1 depicts an exemplary environment in which systems, methods and other aspects of the present disclosure may be implemented.

Referring now to the appended drawings, FIG. 1 is a block diagram of a system environment 100 for determining vehicle recommendations, according to one or more embodiments. The exemplary system environment 100 may include one or more user devices 101, at least one recommendation server 120, at least one vehicle information database 140, at least one traffic database 130, at least one traffic light camera 106, at least one traffic camera 105, and a network 110. The user device 101, the recommendation server 120, the vehicle information database 140, the traffic database 130, the at least one traffic light camera 106, and the at least one traffic camera 105 may be connected to each other via the network 110. Optionally, the at least one traffic light camera 106 and/or the at least one traffic camera 105 may be connected directly to the traffic database 130.

The network 110 may be any suitable network or combination of networks and may support any appropriate protocol suitable for communication of data between various components in the system environment 100. The network 110 may include a public network (e.g., the internet), a private network (e.g., a network within an organization), or a combination of public and/or private networks.

The user device 101 may be operated by users who are searching for vehicles to purchase or lease, and the user device 101 may be used for communication and vehicle recommendation, and may include hardware for location determination. For example, the user device 101 may include a global positioning system (GPS) chip, a cellular modem, and/or any other location determining hardware and software. Examples of a user device 101 may include smartphones, wearable computing devices, tablet computers, laptops, and desktop computers.

The at least one traffic light camera 106 may comprise one or more cameras mounted on or near traffic lights. The traffic lights may be lights that regulate the flow of traffic. For example, a traffic light may display a red light to stop the flow of traffic, a green light for continuous flow of traffic, and a yellow light to indicate caution. The traffic lights may be mounted in various positions, such as free standing, overhead of the traveling vehicles, and/or other positions. The traffic light cameras 106 may collect information of vehicles traveling in the vicinity of the cameras, such as capturing images of the vehicles, videos of the vehicles, a license plate mounted on the vehicles, or any other identifying information of the vehicles.

The at least one traffic camera 105 may be one or more cameras mounted on or near the flow of traffic. The traffic camera 105 may be mounted in various positions, such as free standing, overhead of the traveling vehicles, and/or other positions. The traffic cameras 105 may collect information of vehicles traveling in the vicinity of the cameras, such as capturing images of the vehicles, videos of the vehicles, a license plate mounted on the vehicles, a payment device, or any other identifying information of the vehicles.

The recommendation server 120 may be one or more computers located together or remotely from each other and may employ one or more machine learning models to evaluate the traffic data collected by the at least one traffic light camera 106 and the at least one traffic camera 105. The recommendation server 120 may receive data from the user device 101 related to vehicle preferences and requirements and may transmit vehicle recommendations to the user device 101. References to the recommendation server 120 in the present disclosure may refer to a processor running under the ownership and/or management of the recommendation server 120.

The traffic database 130 may include traffic data collected by the at least one traffic light camera 106 and the at least one traffic camera 105. The traffic data may include captured images and/or videos of the vehicles traveling through the vicinity of the cameras 105 and 106. The traffic data may also include information related to the speed of the vehicles, a time stamp of each of the images captured, a location of each of the cameras 105 and 106, and any other traffic related data. The traffic database 130 may represent one database repository for all of the cameras 105 and 106. In other embodiments, the traffic database 130 may be a plurality of databases each storing data from a predetermined group of cameras 105 and 106. For example, each one of the plurality of traffic databases 130 may store traffic data from cameras located in a certain geographic area.

The vehicle information database 140 may store information regarding available vehicles for purchase. The information may include one or more images of the vehicles, the year, the make, the model, color and trim of the vehicles. The information may also include a fuel economy of the vehicles, a safety rating of the vehicles, and any other information related to the vehicles.

Figure 2:
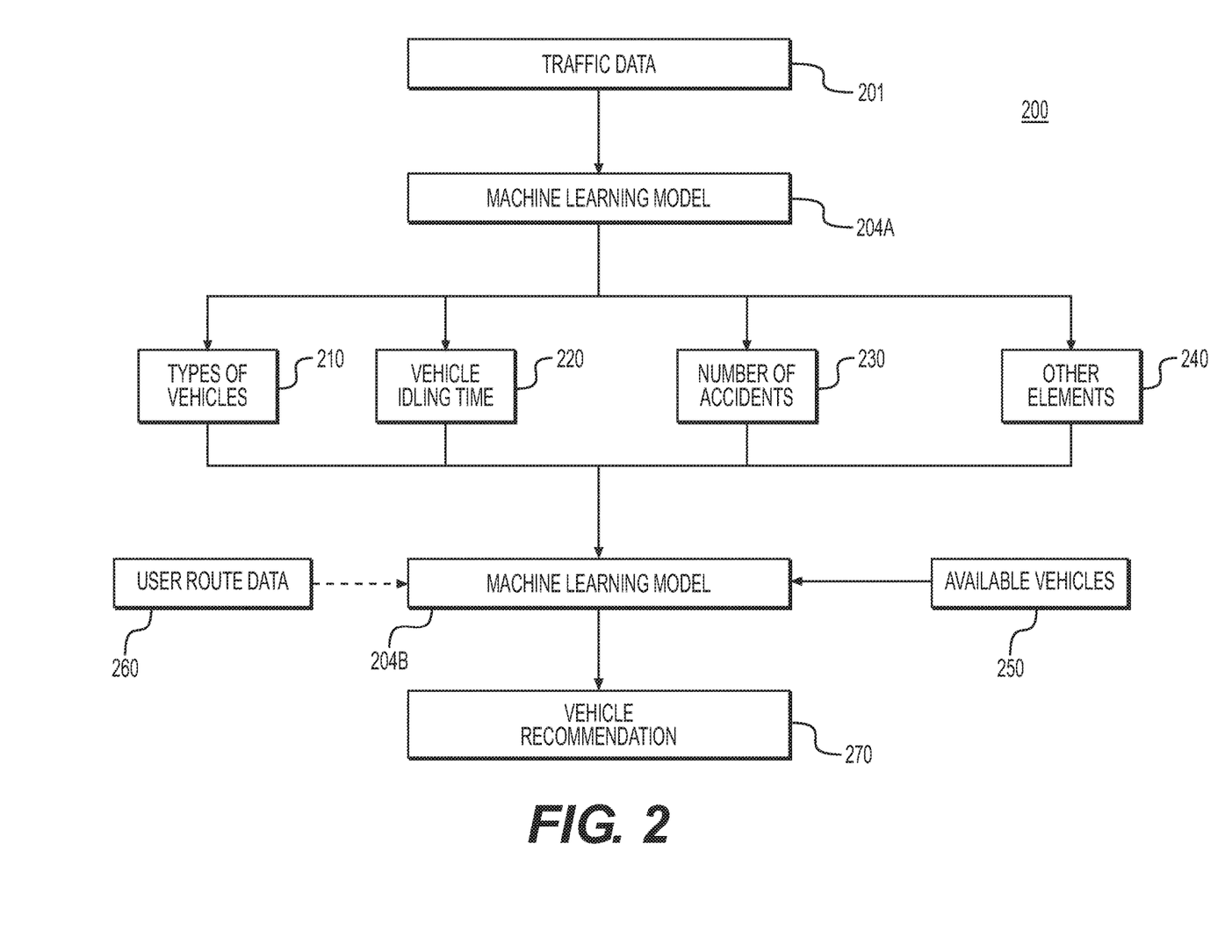
FIG. 2 depicts an exemplary diagram of machine learning models and elements that may be utilized to provide recommendations, according to one or more embodiments.

FIG. 2 depicts an exemplary diagram 200 of the machine learning model and elements utilized to provide recommendations, according to one or more embodiments. Diagram 200 may include traffic data 201, machine learning models 204A and 204B, one or more traffic data elements 210, 220, 230, and 240, available vehicles data 250, optional user route data 260, and vehicle recommendation output 270. The machine learning models 204A and 204B may be the same model or may be different distinct models. The traffic data 201 may be retrieved from the traffic database 130, and the data may be in the format of images and/or videos captured by the traffic cameras 105 and/or traffic light cameras 106. The traffic data 201 may also include the location information of each of the traffic cameras 105 and 106, and a timestamp of when each of the images and/or videos are captured. The traffic data 201 may then be used as inputs for the machine learning model 204A to process and determine traffic data elements and one or more traffic data elements may be determined by the machine learning model 204A. Examples of the elements may include, element 210, which may represent the types of vehicles identified from the images and/or videos; element 220, which may represent an idling time of each identified vehicle; element 230, which may represent a number of vehicle accidents; and/or element 240, which may represent any other information determined from the captured images.

The element 210, which represents the types of vehicles identified from the images and/or videos may further include a color of the vehicle, a year of the vehicle, a make of the vehicle, a model of the vehicle, a volume of each specific make and model of the vehicle, a total volume of all vehicles, and any other identifying information of the vehicle. The element 220, which represents the idling time of each identified vehicle, may be determined by calculating the time between traffic light changes. For example, a first frame of the traffic data 201 may indicate a number of cars stopped at a red light at a first timestamp, and a second frame of the traffic data 201 may indicate the number of vehicles beginning to move at a green light at a second timestamp. Therefore the idling time of the vehicles is the difference between the first timestamp and the second timestamp. The idling time may be determined for every make and model of vehicles determined with regards to the element 210 and stored in the traffic database 130.

Upon processing the elements 210, 220, 230, 240, at least one record may be created for each of the cameras 105 and 106 to include the most common cars (e.g., vehicles of the same make, model, and/or year), the total idling time, the total number of accidents, and the total car volume captured by each of the cameras 105 and 106. The record may be stored in the traffic database 130. Also stored in the traffic database 130 may be a record that contains data regarding the common cars, an average idling time per vehicle, the number of accidents, and the average number of accidents per vehicle for all cameras 105 and 106 in environment 100. The average idling time per vehicle can be calculated by dividing the total idling time of all vehicles from all cameras 105 and 106 by the total volume of vehicles captured by all cameras 105 and 106. In some embodiments, records in the traffic database may further be clustered by time of day, day of the week, weather conditions, or other categories that may be relevant or desired. The average number of accidents per vehicle may be calculated by the total number of accidents by the total volume of vehicles captured by all cameras 105 and 106. In addition to calculating an average number of accidents per vehicle, the accidents may be broken down into categories such as, frontal collision, side collision, rear collision, vehicle rollover, minor collision, serious collision, collisions involving personal injury, collisions causing damage to specific vehicle components, etc. A total and average value for each category of accidents may also be calculated and recorded. The categories of accidents may be determined by analyzing the traffic data 201 utilizing the machine learning models 204A and/or 204B (e.g., a convolutional neural network (CNN) model described below). The machine learning models 204A and/or 204B may for example analyze the traffic data 201 to determine where the collision occurred (e.g., side of a vehicle, front or vehicle, etc.) and may determine if a vehicle has rolled over, or may identify the presence of emergency response vehicles or injured persons (e.g., serious collision). In another embodiment, accident information and categories may be obtained from another source, for example, from police reports.

Upon processing the elements 210, 220, 230, 240, the elements and the records may be utilized by the machine learning model 204B to determine vehicle recommendation output 270. In additional to the elements, the machine learning model 204B may also receive available vehicle data 250 and user route data 260. The available vehicle data 250 may be retrieved from the vehicle information database 140 and the user route data 260 may be received from the user. The user may manually enter the route data into the user device 101 (e.g., starting and destination address, a zip code, one or more points of interest, one or more landmarks, travel history, and/or other relevant information), or the route data 260 may be imported automatically from the user device 101. Once the user route data 260 is received, the machine learning model 204B may process the data and determine cameras 105 and 106 that are present along the route. The cameras 105 and 106 may be determined based on the address and/or the longitude and latitude data of the cameras 105 and 106. Upon determining the cameras 105 and 106 present along the route, data regarding the common vehicles, idling time, and number of accidents, etc., may be retrieved for each of the cameras. Furthermore, a route vehicle information, a route-specific average idling time, and/or route accident number(s) may be determined. The route vehicle information may be determined by calculating the total number of most common vehicles along the route. The route-specific average idling time may be determined by dividing the total idling time of vehicles along the route by the total volume of vehicles along the route. The route accident number may be calculated by dividing the total number of accidents along the route by the total volume of vehicles along the route.

An example of determining the route vehicle information, the route-specific average idling time, and the route accident number will be hereby described. After entering the route data 260 by the user, the machine learning model 204B may determine that there are 3 traffic and/or traffic light cameras along the route (e.g., camera x, camera y, and camera z). The traffic records determined by machine learning model 204A discussed above may then be retrieved for each of the cameras x, y, and z. For example, the traffic records may be represented by the table 1 below:

TABLE 1

|  | Camera x | Camera y | Camera z |
| --- | --- | --- | --- |
| Common Cars | 100 Acura vehicles 50 Ford vehicles 10 Mazda vehicles | 50 Acura vehicles 5 Ford vehicles 100 Mazda vehicles | 10 Acura vehicles 25 Ford vehicles 2 Mazda vehicles |
| Total Idling Time | 1000 minutes | 2000 minutes | 500 minutes |
| Number of Accidents | 10 | 100 | 20 |
| Total vehicle volume | 500 | 300 | 200 |

Based on the traffic records, the most common vehicles along the route may be a total of 160 Acura vehicles, 80 Ford vehicles, and 112 Mazda vehicles. In some embodiments, the most common vehicles may be broken down into categories based on characteristics of the most common vehicles on the route, for example, relative weight class, number of passengers, vehicle dimensions, driver training requirements, and so forth. The route-specific average idling time may be calculated to be 3.5 minutes per vehicle (e.g., dividing the total idling time of vehicles along the route by the total volume of vehicles along the route). The route accident number may be calculated to be 0.13 (e.g., dividing the total number of accidents along the route by the total volume of vehicles along the route). In addition to calculating an overall route accident number, the accidents may be broken down into categories such as, frontal collision, side collision, rear collision, vehicle rollover, minor collision, serious collision, etc. A total and average value for each category of accidents may also be calculated. The calculated most common vehicle along the route, the route-specific average idling time, and the route accident number may then be used by the machine learning model 204B in the recommendation process to determine recommended vehicles for purchase or lease by the user.

The machine learning model 204B may access the available vehicles data 250 to determine a complete pool of available vehicles. The machine learning model 204B may then use the most common vehicle along the route, the route-specific average idling time, and the route accident number as filters to narrow down a list of recommended vehicles. The machine learning model 204B may apply a predetermined weighting value to the most common vehicle along the route so that the most common vehicles may be ranked higher than non-common vehicles. Furthermore, the machine learning model 204B may compare the route-specific average idling time (denoted by a variable such as $Idling_{route}$) and the route accident number (denoted by a variable such as $A_R$) to the average idling time per vehicle (denoted by a variable such as $Idling_{Average}$), and/or the average number of accidents per vehicle (denoted by a variable such as $A_N$) for all cameras 105 and 106 in environment 100 and limit the available vehicles to those with adequate city fuel economy and safety rating. In an exemplary embodiment, the machine learning model 204B may configure filters as represented by example tables 2 and 3 below:

TABLE 2

| Idling Times greater than the average idling time per vehicle ($Idling_{route}$ - $Idling_{Average}$) | Fuel Economy of recommended vehicles |
|---|---|
| Less than 0 seconds | Any |
| 30 seconds - 1 minute | Greater than 15 miles per gallon city |
| 1 minute - 15 minutes | Greater than 20 miles per gallon city |

TABLE 3

| Accident percentage ($A_R/A_N$) | Safety Rating of recommended vehicles |
|---|---|
| Less than .05 | Any |
| .05-.1 | Greater than or equal to 1 star |
| .1-.15 | Greater than or equal to 2 stars |

The machine learning model 204B may compare the route-specific average idling time with the average idling time ($Idling_{route}$–$Idling_{Average}$) for an indication of whether the vehicles along the route supplied by the user have a greater idling time compared to overall average idling time. Having a higher route-specific idling time may indicate that the route supplied by the user may use more fuel, and therefore vehicles with higher city fuel economy may be preferred. The machine learning model 204B may also calculate an accident percentage by dividing the route accident number by the average number of accident per vehicle ($A_R/A_N$). Having a high accident percentage may indicate that the route supplied by the user may be more susceptible to accidents, and therefore vehicles with better safety rating may be preferred. Once the vehicle recommendation output 270 have been determined, the vehicles may be displayed to the user on a user device 101.

The configuration listed in table 2 and table 3 are for exemplary purposes and not to be construed as limiting. The machine learning model 204B may configure filters according to any number of data ranges.

The machine learning models 204A and 204B may include a regression-based model that accepts the traffic data 201 including captured traffic images and captured traffic videos, traffic data elements 210, 220, 230, and 240, available vehicles data 250, and/or user route data 260 as input data. The trained machine learning model may be part of the recommendation server 120. The trained machine learning model may be of any suitable form, and may include, for example, a neural network. A neural network may be software representing a human neural system (e.g., cognitive system). A neural network may include a series of layers termed "neurons" or "nodes." A neural network may comprise an input layer, to which data is presented, one or more internal layers, and an output layer. The number of neurons in each layer may be related to the complexity of a problem to be solved. Input neurons may receive data being presented and then transmit the data to the first internal layer through the connections' weight. The trained machine learning algorithm may include a convolutional neural network (CNN), a deep neural network, or a recurrent neural network (RNN).

A CNN may be a deep and feed-forward artificial neural network. A CNN may be applicable to analyzing visual images, such as the one or more images of the captured traffic data, described elsewhere herein. A CNN may include an input layer, an output layer, and multiple hidden layers. Hidden layers of a CNN may include convolutional layers, pooling layers, or normalization layers. Layers may be organized in three dimensions: width, height, and depth. The total number of convolutional layers may be at least about 3, 4, 5, 10, 15, 20 or more. The total number of convolutional layers may be at most about 20, 15, 10, 5, 4, or less.

Convolutional layers may apply a convolution operation to an input and pass results of a convolution operation to a next layer. For processing images, a convolution operation may reduce the number of free parameters, allowing a network to be deeper with fewer parameters. In a convolutional layer, neurons may receive input from only a restricted subarea of a previous layer. A convolutional layer's parameters may comprise a set of learnable filters (or kernels). Learnable filters may have a small receptive field and extend through the full depth of an input volume. During a forward pass, each filter may be convolved across the width and height of an input volume, compute a dot product between entries of a filter and an input, and produce a 2-dimensional activation map of that filter. As a result, a network may learn filters that activate when detecting some specific type of feature at some spatial position as an input.

An RNN may be configured to receive sequential data (e.g., accidents and vehicle information) as an input, such as consecutive data inputs, and the RNN may update the internal state at every time step. An RNN can be applicable to tasks such as image captioning or time series anomaly detection. The RNN may include a fully recurrent neural network, independently recurrent neural network, Jordan networks, Echo state, neural history compressor, gated recurrent unit, multiple timescales model, differentiable neural computer, or any combination thereof.

The machine learning model may compute the vehicle recommendation as a function of the traffic data, traffic data elements, available vehicles data, and user route data, and/or one or more variables indicated in the input data. The one or more variables may be derived from the traffic data, traffic data elements, available vehicles data, and user route data. This function may be learned by training the machine learning model with training sets.

The machine learning model may be trained by supervised, unsupervised, or semi-supervised learning using training sets comprising data of types similar to the type of data used as the model input. For example, the training set used to train the model may include any combination of the following: the traffic data, traffic data elements, available vehicles data, and user route data. Accordingly, the machine learning model may be trained to map input variables to a quantity or value of a vehicle recommendation for the user. That is, the machine learning model may be trained to determine a quantity or value of the vehicle recommendation of the user as a function of various input variables.

Figure 3A:
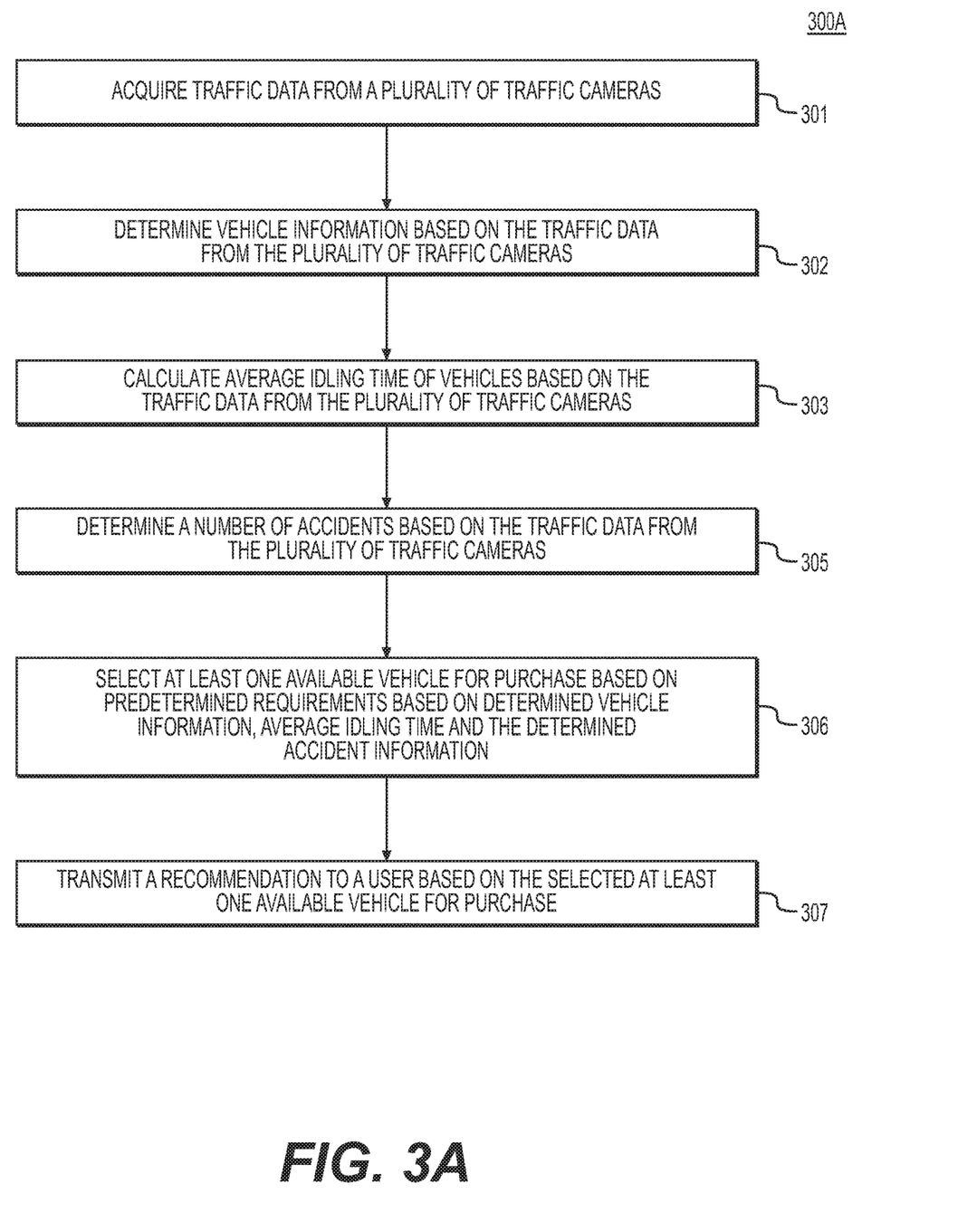
FIGS. 3A and 3B depict exemplary flow charts for vehicle recommendations based on traffic camera data, according to one or more embodiments.

FIG. 3A depicts an exemplary flow charts of a method 300A for vehicle recommendations based on traffic camera data, according to one or more embodiments. The steps described in the method 300A may correspond to the discussion above with regards to FIG. 2. The method 300A may begin at step 301 where traffic data may be acquired from a plurality of traffic cameras. At step 302, a determination may be made for vehicle information based on the traffic data from the plurality of traffic cameras. As discussed above, the determination may be made by one or more machine learning models and the vehicle information may include a color of the vehicle, a year of the vehicle, a make of the vehicle, a model of the vehicle, a volume of each specific make and model of the vehicle, a total volume of all vehicles, and any other identifying information of the vehicle. At step 303, an average idling time of vehicles based on the traffic data from the plurality of traffic cameras may be calculated, as discussed above with regards to FIG. 2 At step 305, a determination may be made for a number of accidents based on the traffic data from the plurality of traffic cameras. At step 306, at least one available vehicle may be selected for purchase based on predetermined requirements based on determined vehicle information, average idling time, and/or the determined accident information, as discussed above with regards to FIG. 2. At step 307, a recommendation may be transmitted to a user based on the selected at least one available vehicle for purchase. In some embodiments, the calculated average idling time may be associated with the determined vehicle information to generate a vehicle-specific average idling time. Accordingly, the at least one vehicle selected at step 306 may be selected based on the vehicle-specific average idling time, alternatively or in addition to the other information discussed above.

Figure 3B:
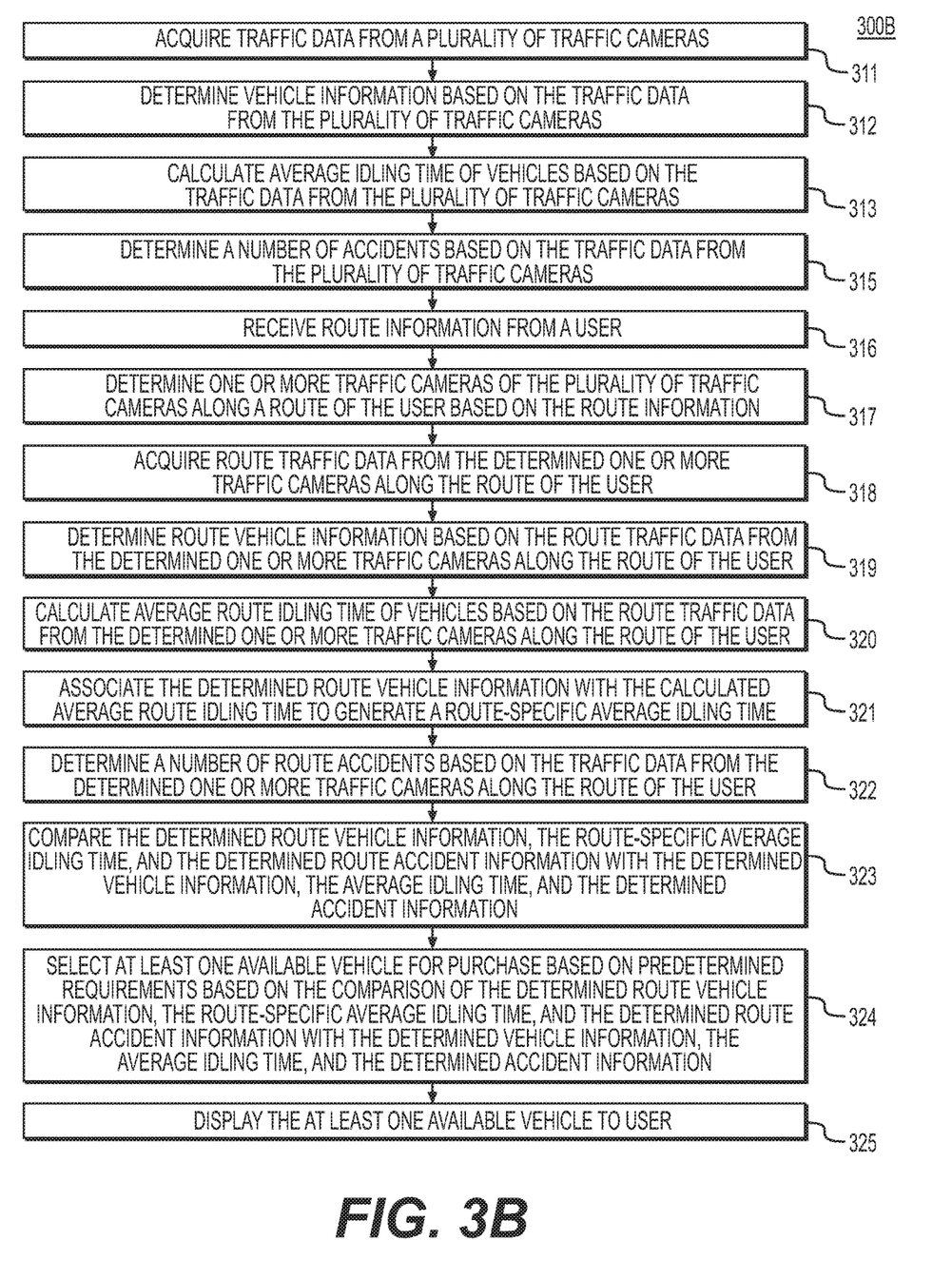

FIG. 3B depicts an exemplary flow charts of a method 300B for vehicle recommendations based on traffic camera data, according to one or more embodiments. The steps described in the method 300B may correspond to the discussion above with regards to FIG. 2. The method 300B may begin at step 311 where traffic data may be acquired from a plurality of traffic cameras. At step 312, a determination may be made for vehicle information based on the traffic data from the plurality of traffic cameras. As discussed above, the determination may be made by one or more machine learning models and the vehicle information may include a color of the vehicle, a year of the vehicle, a make of the vehicle, a model of the vehicle, a volume of each specific make and model of the vehicle, a total volume of all vehicles, and/or any other identifying information of the vehicle. At step 313, an average idling time of vehicles based on the traffic data from the plurality of traffic cameras may be calculated. At step 315, a determination may be made for a number of accidents based on the traffic data from the plurality of traffic cameras. At step 316, a route information may be received from a user. The route information may be submitted as a starting and destination address, a zip code, one or more points of interest, one or more landmarks, travel history, and/or other relevant information. At step 317, a determination may be made for one or more traffic cameras of the plurality of traffic cameras along a route of the user based on the route information. The determination may be similar to the determination steps as discussed above with regards to FIG. 2. At step 318, route traffic data may be acquired from the determined one or more traffic cameras along the route of the user. At step 319, a determination may be made for route vehicle information based on the route traffic data from the determined one or more traffic cameras along the route of the user. At step 320, a calculation may be performed to determine an average route idling time of vehicles based on the route traffic data from the determined one or more traffic cameras along the route of the user. At step 321, the calculated average route idling time may be associated with the determined route vehicle information to generate a route-specific average idling time. At step 322, a number of route accidents may be determined based on the traffic data from the determined one or more traffic cameras along the route of the user. At step 323, the determined route vehicle information, the route-specific average idling time, and the determine route accident information may be compared to the determined vehicle information, the average idling time, and the determined accident information. At step 324, at least one available vehicle for purchase may be selected based on predetermined requirements based on the comparisons of the determined route vehicle information, the route-specific average idling time, and/or the determined route accident information with the determined vehicle information, the average idling time, and/or the determined accident information. At step 325, the selected at least one available vehicle may be displayed to the user as a recommendation. In some embodiments, the calculated average idling time may be associated with the determined vehicle information to generate a vehicle-specific average idling time. Accordingly, the at least one vehicle selected at step 324 may be selected based on the vehicle-specific average idling time, alternatively or in addition to the other information discussed above.

Figure 4:
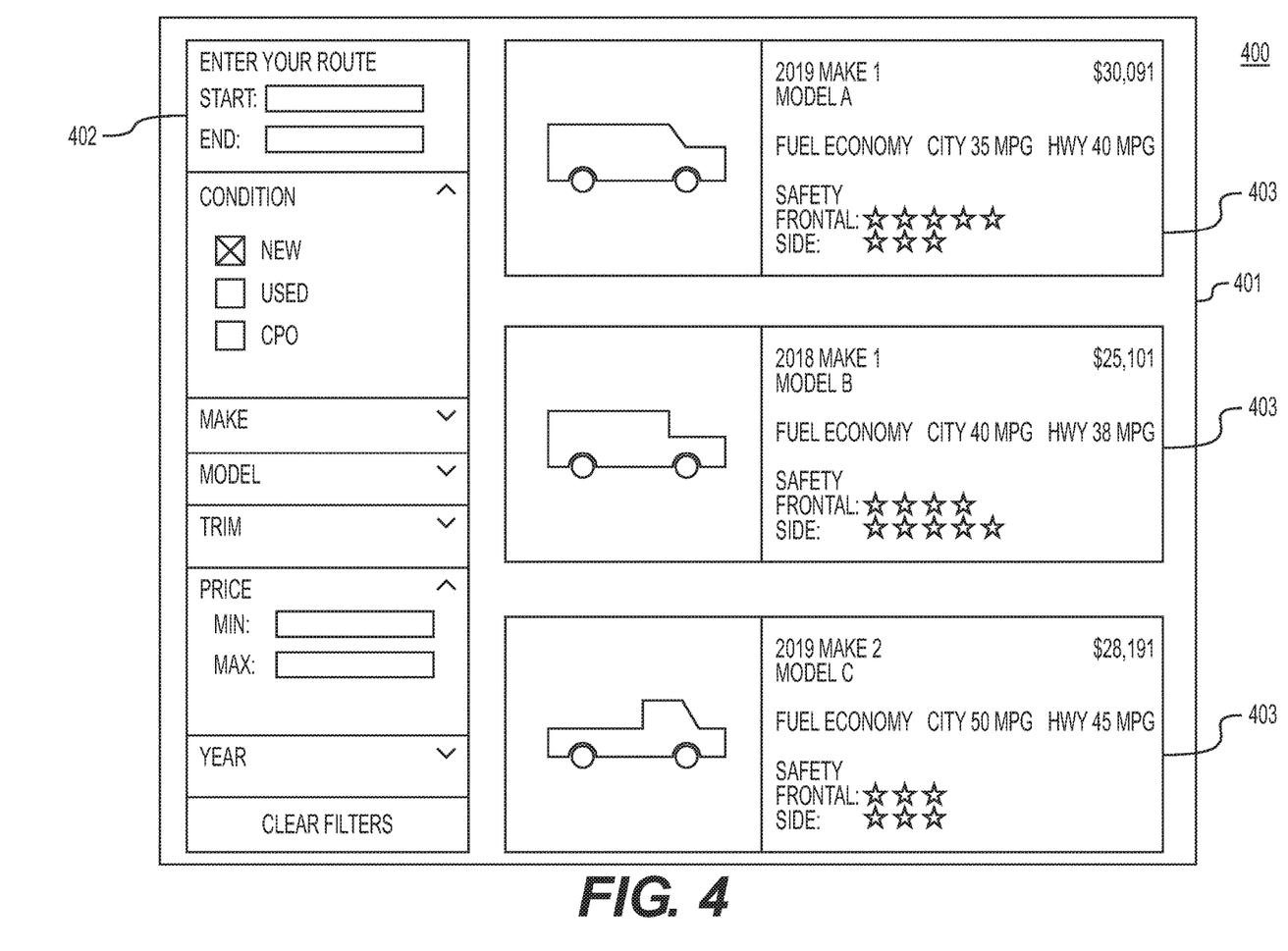
FIG. 4 depicts an exemplary user interface for vehicle recommendations based on traffic camera data, according to one or more embodiments.

FIG. 4 depicts an exemplary user interface 400 for vehicle recommendations based on traffic camera data, according to one or more embodiments. The user interface 400 may be executed on any device used by a user, for example user device 101, such as smartphones, wearable computing devices, tablet computers, laptops, or desktop computers and may be implemented via a web browser, an application, or a chat bot.

The user interface 400 may include a filter settings window 402, a product recommendation screen 401, and/or one or more recommended vehicles 403. The user may enter the route information in the filter settings window 402 to initiate the recommendation process. Once available vehicles have been determined that match the predetermined criteria, the available vehicles may be displayed in the recommendation screen 401 as recommended vehicles 403. The recommended vehicles 403 may include detailed vehicle information such as year, make, model, and image of the vehicle. Other information such as the vehicle fuel economy and safety rating may also be displayed to the user. The recommended vehicles 403 may be displayed in the recommendation screen 401 in the order of recommendation. For example, vehicle model A may be the highest recommended vehicle and vehicle model C may be the lowest recommended vehicle. The recommendation screen 401 may also use color coding to indicate the order of recommendation. For example, the most recommended vehicle may be displayed in green, or highlighted in another color to distinguish the most recommended vehicle from the other recommended vehicles and to indicate the level of recommendation. The user may further narrow the number of recommended vehicles by selecting any of the filter criteria listed in the filter settings window 402. For example, the user may set a maximum price of the vehicle, or may select a specific year or model of a vehicle. The recommendation screen 401 may update and display one or more recommended vehicles 403 based on any filter criteria selected by the user.

In one embodiment, the displayed recommended vehicles 403 may include information related to the merchant selling the vehicle. The user may perform an interaction on any one of the recommended vehicles 403 and the user may be directed to the merchant. The interaction may include the user clicking on one of the recommended vehicles 403 with a mouse or other hardware, or the interaction may be the user performing a gesture, such as a touch, on one of the recommended vehicles 403. Once the interaction is detected, the user may be directed to a website of the merchant listing more details of the recommended vehicles 403, and/or the user may be presented with the contact information of the merchant.

In another embodiment, the user may perform an interaction on any one of the recommended vehicles 403 and the user may be directed to a listing of all the specific vehicle available in a geographic area of the user. The interaction may include the user clicking on one of the recommended vehicles 403 with a mouse or other hardware, or the interaction may be the user performing a gesture, such as a touch, on one of the recommended vehicles 403. For example, an interaction may be detected on the vehicle Make 1 Model A, then the recommendation screen 401 may display all of the Make 1 Model A vehicles available for sale in the geographic area of the user. The geographic area of the user may be determined by the route information entered by the user or may be determined by location services of the user device 101. The user may then interact with any specific Make 1 Model A vehicles and the user may be directed to the merchant having the specific Make 1 Model A vehicle available.

Figure 5:
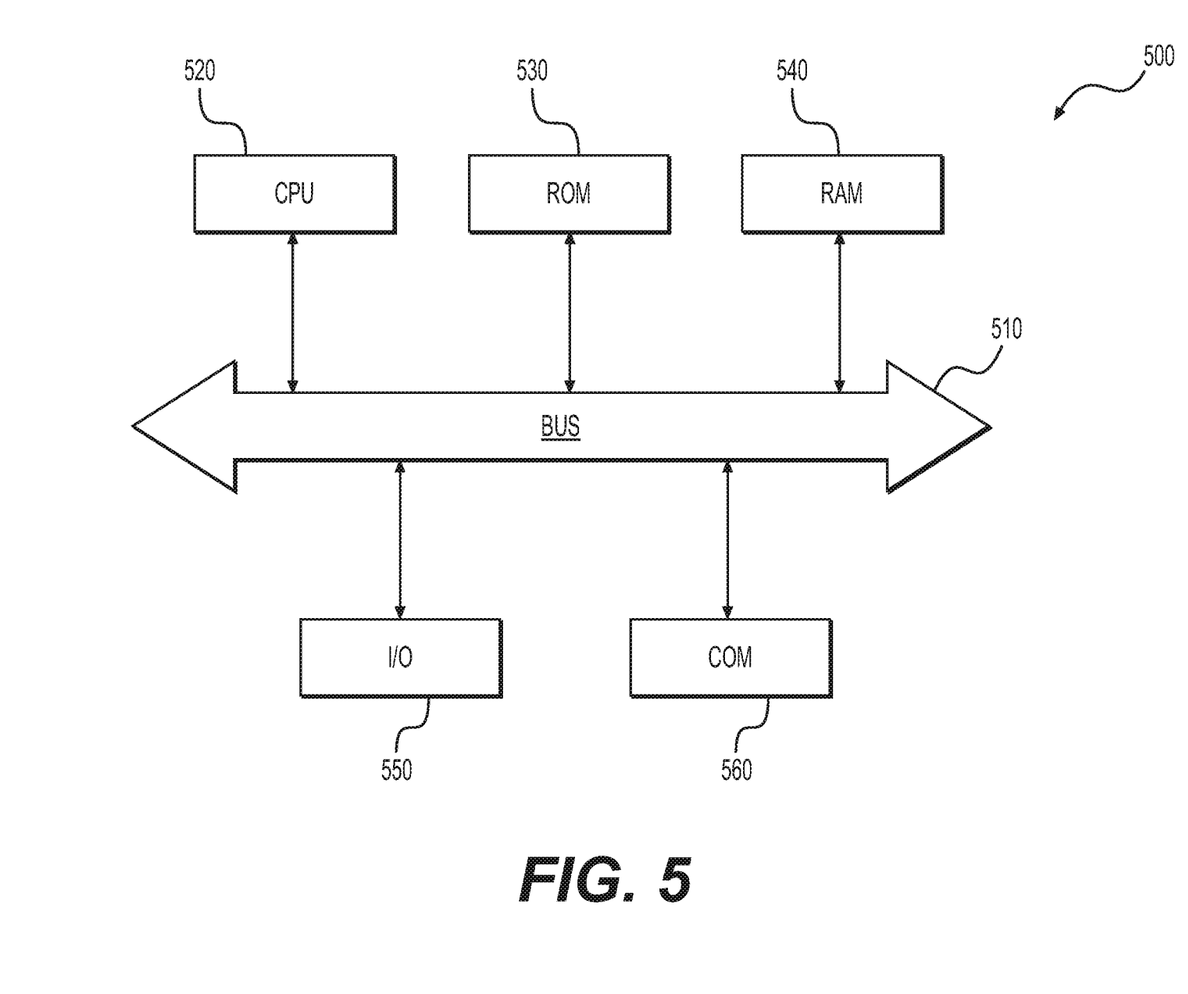
FIG. 5 depicts an exemplary computer device or system, in which embodiments of the present disclosure, or portions thereof, may be implemented

FIG. 5 depicts a high-level functional block diagram of an exemplary computer device or system 500, in which embodiments of the present disclosure, or portions thereof, may be implemented, e.g., as computer-readable code. Additionally, each of the exemplary computer servers, databases, user interfaces, modules, and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4, may be implemented using one or more of a device 500.

As shown in FIG. 5, the device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, such as, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link, or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

After reading this description, it will become apparent to a person skilled in the relevant art how to implement embodiments of the present disclosure using these or other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added to, deleted from, or repeated, in methods described herein, while remaining within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for providing vehicle recommendations based on traffic camera data, the method comprising:
   acquiring, by one or more processors, traffic data from a plurality of traffic cameras;
   determining, by the one or more processors using one or more machine learning models, vehicle information based on the traffic data from the plurality of traffic cameras, wherein the one or more machine learning models analyze the traffic data to identify vehicle information;
   calculating, by the one or more processors, average idling time of vehicles based on the traffic data from the plurality of traffic cameras;
   determining, by the one or more processors using the one or more machine learning model, accident information based on the traffic data from the plurality of traffic cameras, wherein the one or more machine learning models analyze the traffic data to identify accident information;
   selecting, by the one or more processors, at least one available vehicle for purchase, wherein the at least one available vehicle matches one or more predetermined requirements based on the average idling time and the determined accident information; and
   transmitting, by the one or more processors, a recommendation to a user based on the selected at least one available vehicle for purchase.

2. The computer-implemented method of claim 1, wherein selecting at least one available vehicle for purchase further comprises:
   selecting at least one available vehicle matching one or more predetermined requirements based on the determined vehicle information.

3. The computer-implemented method of claim 1, further comprising:
   generating, by the one or more processors, a first predetermined weighting value;
   associating, by the one or more processors, the first predetermined weighting value with a first available vehicle for purchase;
   generating, by the one or more processors, a second predetermined weighting value;
   associating, by the one or more processors, the second predetermined weighting value with a second available vehicle for purchase; and
   ranking, by the one or more processors, the first and second available vehicles for purchase based on the first and second predetermined weighting values;
   wherein selecting at least one available vehicle for purchase further comprises selecting the first or second available vehicle for purchase based on the ranking.

4. The computer-implemented method of claim 1, further comprising:
   receiving, by the one or more processors, route information from the user;
   determining, by the one or more processors, one or more traffic cameras of the plurality of traffic cameras along a route of the user based on the route information and a geographic location value of the one or more traffic cameras;
   determining, by the one or more processors, route vehicle information based on route traffic data from the determined one or more traffic cameras along the route of the user;
   calculating, by the one or more processors, average route idling time of vehicles based on the route traffic data from the determined one or more traffic cameras along the route of the user; and
   associating, by the one or more processors, the determined route vehicle information with the calculated average route idling time to generate a route-specific average idling time.

5. The computer-implemented method of claim 4, further comprising:
   determining, by the one or more processors, a route accident number based on the traffic data from the determined one or more traffic cameras along the route of the user.

6. The computer-implemented method of claim 5, further comprising:
   determining, by the one or more processors, at least one of a fuel economy and a safety rating of the at least one available vehicle for purchase.

7. The computer-implemented method of claim 6, wherein the selecting the at least one available vehicle for purchase further comprises comparing the at least one of the fuel economy and the safety rating of the at least one available vehicle for purchase with the route-specific average idling time and the route accident number.

8. The computer-implemented method of claim 1, wherein the determining, by the one or more processors, accident information based on the traffic data from the plurality of traffic cameras further comprises identifying at least one category of accidents.

9. The computer-implemented method of claim 1, wherein calculating the average idling time of vehicles is based on traffic light data from the plurality of traffic cameras.

10. The computer-implemented method of claim 1, wherein the vehicle information comprises one or more of vehicle weight class, vehicle make, vehicle model, or vehicle year of the vehicles.

11. A computer system for providing vehicle recommendations based on traffic camera data, the computer system comprising:
  at least one memory having processor-readable instructions stored therein; and
  at least one processor configured to access the memory and execute the processor-readable instructions, which when executed by the processor configures the processor to perform a plurality of functions, including functions for:
  acquiring traffic data from a plurality of traffic cameras;
  determining vehicle information based on the traffic data from the plurality of traffic cameras using one or more machine learning models, wherein the one or more machine learning models analyze the traffic data to identify vehicle information;
  calculating average idling time of vehicles based on the traffic data from the plurality of traffic cameras;
  determining accident information based on the traffic data from the plurality of traffic cameras using one or more machine learning models, wherein the one or more machine learning models analyze the traffic data to identify accident information;
  selecting at least one available vehicle for purchase, wherein the at least one available vehicle matches one or more predetermined requirements based on the average idling time and determined accident information; and
  transmitting a recommendation to a user based on the selected at least one available vehicle for purchase.

12. The computer system of claim 11, wherein the functions further comprise:
  selecting at least one available vehicle for purchase matching one or more predetermined requirements based on the determined vehicle information.

13. The computer system of claim 11, wherein the functions further comprise:
  generating a first predetermined weighting value;
  associating the first predetermined weighting value with a first available vehicle for purchase;
  generating a second predetermined weighting value;
  associating the second predetermined weighting value with a second available vehicle for purchase; and
  ranking the first and second available vehicles for purchase based on the first and second predetermined weighting values;
  wherein selecting at least one available vehicle for purchase further comprises selecting the first or second available vehicle for purchase based on the ranking.

14. The computer system of claim 11, wherein the functions further comprise:
  receiving route information from the user;
  determining one or more traffic cameras of the plurality of traffic cameras along a route of the user based on the route information and a geographic location value of the one or more traffic cameras;
  determining route vehicle information based on route traffic data from the determined one or more traffic cameras along the route of the user;
  calculating average route idling time of vehicles based on the route traffic data from the determined one or more traffic cameras along the route of the user; and
  associating the determined route vehicle information with the calculated average route idling time to generate a route-specific average idling time.

15. The computer system of claim 14, wherein the functions further comprise:
  determining route accident number based on the traffic data from the determined one or more traffic cameras along the route of the user.

16. The computer system of claim 15, wherein the functions further comprise:
  determining at least one of a fuel economy and a safety rating of the at least one available vehicle for purchase.

17. The computer system of claim 16, wherein selecting the at least one available vehicle for purchase further comprises comparing the at least one of the fuel economy and the safety rating of the at least one available vehicle for purchase with the route-specific average idling time and the route accident number.

18. The computer system of claim 11, wherein determining accident information based on the traffic data from the plurality of traffic cameras further comprises identifying at least one category of accidents.

19. The computer system of claim 11, wherein calculating the average idling time of vehicles is based on traffic light data from the plurality of traffic cameras.

20. A computer-implemented method for providing vehicle recommendations based on traffic camera data, the method comprising:
  acquiring, by one or more processors, traffic data from a plurality of traffic cameras;
  determining, by the one or more processors using one or more machine learning models, vehicle information based on the traffic data from the plurality of traffic cameras, wherein the one or more machine learning models analyze the traffic data to identify vehicle information;
  calculating, by the one or more processors, average idling time of vehicles based on the traffic data from the plurality of traffic cameras;
  determining, by the one or more processors using one or more machine learning models, accident information based on the traffic data from the plurality of traffic cameras, wherein the one or more machine learning models analyze the traffic data to identify accident information;
  receiving, by the one or more processors, route information from a user;
  determining, by the one or more processors, one or more traffic cameras of the plurality of traffic cameras along a route of the user based on the route information;
  acquiring, by the one or more processors, route traffic data from the determined one or more traffic cameras along the route of the user;
  determining, by the one or more processors, route vehicle information based on the route traffic data from the determined one or more traffic cameras along the route of the user;
  calculating, by the one or more processors, average route idling time of vehicles based on the route traffic data from the determined one or more traffic cameras along the route of the user;

associating, by the one or more processors, the determined route vehicle information with the calculated average route idling time to generate a route-specific average idling time;

determining, by the one or more processors, route accident number based on the traffic data from the determined one or more traffic cameras along the route of the user;

comparing, by the one or more processors, the determined route vehicle information, the route-specific average idling time, and the determined route accident number with the determined vehicle information, the average idling time, and the determined accident information, respectively;

selecting, by the one or more processors, at least one available vehicle for purchase, wherein the at least one available vehicle matches a predetermined requirement based on the comparison of the determined route vehicle information, the route-specific average idling time, and the determined route accident number with the determined vehicle information, the average idling time, and the determined accident information, respectively; and displaying, by the one or more processors, the at least one available vehicle to the user.

* * * * *